US009965092B2

(12) United States Patent
Smith

(10) Patent No.: US 9,965,092 B2
(45) Date of Patent: May 8, 2018

(54) MANAGING POWER CONSUMPTION OF FORCE SENSORS

(71) Applicant: Apple Inc., Cupertino, CA (US)

(72) Inventor: John Stephen Smith, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/158,548

(22) Filed: May 18, 2016

(65) Prior Publication Data

US 2017/0336902 A1 Nov. 23, 2017

(51) Int. Cl.
*G06F 3/041* (2006.01)
*G06F 3/045* (2006.01)
*G06F 1/32* (2006.01)

(52) U.S. Cl.
CPC .......... *G06F 3/0416* (2013.01); *G06F 1/3203* (2013.01); *G06F 3/045* (2013.01); *G06F 3/0414* (2013.01); *G06F 2203/04106* (2013.01)

(58) Field of Classification Search
CPC ...... G06F 3/0416; G06F 3/0414; G06F 3/045; G06F 3/041; G06F 3/044; G06F 2203/04105; G06F 1/3203; G06F 1/3234; G01L 1/22; G01L 1/2218; G01L 1/2225; G01L 1/2237; G01L 1/225; G01L 1/2262; G01L 1/2268
See application file for complete search history.

(56) References Cited

U.S. PATENT DOCUMENTS

| 7,152,482 | B2 | 12/2006 | Ueno et al. |
| 8,144,271 | B2 | 3/2012 | Han |
| 8,305,358 | B2 * | 11/2012 | Klinghult ............... G06F 3/0414 178/18.05 |
| 8,421,483 | B2 * | 4/2013 | Klinghult ................ G06F 3/044 324/658 |
| 8,547,495 | B2 | 10/2013 | Lee |
| 8,553,004 | B2 | 10/2013 | Hotelling et al. |
| 8,560,947 | B2 | 10/2013 | Gillespie et al. |
| 8,618,720 | B2 | 12/2013 | Paleczny et al. |

(Continued)

FOREIGN PATENT DOCUMENTS

WO  WO 15/077200  5/2015

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Jennifer Mehmood
*Assistant Examiner* — Sardis F Azongha
(74) *Attorney, Agent, or Firm* — Brownstein Hyatt Farber Schreck, LLP

(57) ABSTRACT

A force-responsive sensor incorporating a force-sensitive element is in communication with a power controller. The power controller changes one or more performance characteristics associated with the force-responsive sensor. A performance characteristic can include a bias voltage or current, a duty cycle, a sampling rate, and so on. The performance characteristic(s) can be changed in response to a touch event or based on an operational setting of the force-responsive sensor (or an electronic device incorporating the force-responsive sensor). Regulation of the performance characteristic(s) reduces power consumption of the force-responsive sensor.

19 Claims, 9 Drawing Sheets

(56) References Cited

U.S. PATENT DOCUMENTS

| | | |
|---|---|---|
| 8,629,841 B2 | 1/2014 | Degner et al. |
| 8,631,567 B2 | 1/2014 | Lee et al. |
| 8,730,199 B2 | 5/2014 | Sleeman et al. |
| 8,743,060 B2 | 6/2014 | Hotelling |
| 8,878,811 B1 | 11/2014 | Baumbach |
| 8,970,507 B2 | 3/2015 | Holbein et al. |
| 8,988,384 B2 * | 3/2015 | Krah .................... G06F 3/0414 178/18.05 |
| 9,081,453 B2 | 7/2015 | Bulea et al. |
| 9,116,570 B2 | 8/2015 | Lee et al. |
| 9,232,636 B2 | 1/2016 | Ozeki et al. |
| 9,348,472 B2 * | 5/2016 | Kang .................... G06F 3/0416 |
| 2009/0002199 A1 | 1/2009 | Lainonen et al. |
| 2009/0326833 A1 | 12/2009 | Ryhanen et al. |
| 2011/0080349 A1 * | 4/2011 | Holbein ................ G06F 1/3203 345/173 |
| 2012/0086666 A1 | 4/2012 | Badaye et al. |
| 2013/0082970 A1 | 4/2013 | Frey et al. |
| 2015/0084909 A1 | 3/2015 | Worfolk et al. |
| 2015/0103038 A1 | 4/2015 | Han et al. |
| 2015/0339001 A1 | 11/2015 | Zirkl et al. |
| 2016/0062497 A1 | 3/2016 | Huppi et al. |

OTHER PUBLICATIONS

Feist, "Samsung snags patent for new pressure sensitive touchscreens," posted on AndroidAuthority.com at URL: http://www.androidauthority.com/samsung-patent-pressure-sensitive-touch-screens-354860, Mar. 7, 2014, 1 page.

Min et al., "Adaptive Touch Sampling for Energy-Efficient Mobile Platforms," Intel Corporation, Hillsboro, OR 97124, 4 pages.

* cited by examiner

MANAGING POWER CONSUMPTION OF FORCE SENSORS

FIELD

Embodiments described herein generally relate to input sensors and, more particularly, to systems and methods for managing power consumption of force sensors.

BACKGROUND

An electronic device can include an input surface to receive a force exerted on that surface by a user. A sensor coupled to the input surface is configured to generate a signal corresponding to a deformation of the input surface that results from the exerted force. The signal can be used by the electronic device to determine an operation to perform in response to the exerted force.

The performance of the sensor may be affected by the precision with which the deformation of the input surface can be detected. Accordingly, in many cases, the sensor includes a force-sensitive element in order to measure minute physical changes in the input surface as a result of the deformation caused by the exerted force. An output of the force-sensitive element is typically filtered and/or amplified prior to being processed by the sensor and correlated to the exerted force.

However, the power resources often required to amplify and/or filter the output of the strain-sensitive element may not be available to all electronic devices.

SUMMARY

Certain embodiments described herein may relate to, include, or take the form of an electronic device including an input surface configured to receive a force exerted by a user. A touch sensor can be coupled to the input surface. A force-responsive sensor can also be coupled to the input surface. The force-responsive sensor can include a collection of strain-sensitive elements, each associated with a different portion of the input surface. In addition, the force-responsive sensor includes a circuit coupled to at least one strain-sensitive element of the force-responsive sensor. The circuit can also include an amplifier. The force-responsive sensor can also include a power controller coupled to the amplifier. The power controller is configured to change a performance characteristic (e.g., duty cycle, sampling rate, supply voltage, supply current, voltage bias, current bias, and so on) of the amplifier in response to a signal from the touch sensor that a touch event is detected at a location proximate to the at least one strain-sensitive element.

Other embodiments described herein generally reference an electronic device including a force-responsive sensor coupled to an input surface. The force-responsive sensor includes a collection of strain-sensitive elements, each associated with a different portion of the input surface. Similar to other embodiments described herein, the force-responsive sensor includes a circuit coupled to each strain-sensitive element of the force-responsive sensor. The force-responsive sensor also includes a power controller. The power controller is in communication with the circuit and is configured to selectively enable a subset of strain-sensitive elements of the force-responsive sensor in response to a signal that a touch event is detected on the input surface.

Still further embodiments described herein generally reference a method of operating a force-responsive sensor including at least the operations of: detecting a touch event on an input surface of an electronic device (the input surface positioned relative to the force-responsive sensor); determining a subset of force-sensitive elements associated with the force-responsive sensor that are proximate to the touch event; activating each force-sensitive element of the subset of force-sensitive elements; and changing a performance characteristic of a drive circuit configured to apply a drive signal to each force-sensitive element of the subset of force-sensitive elements.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
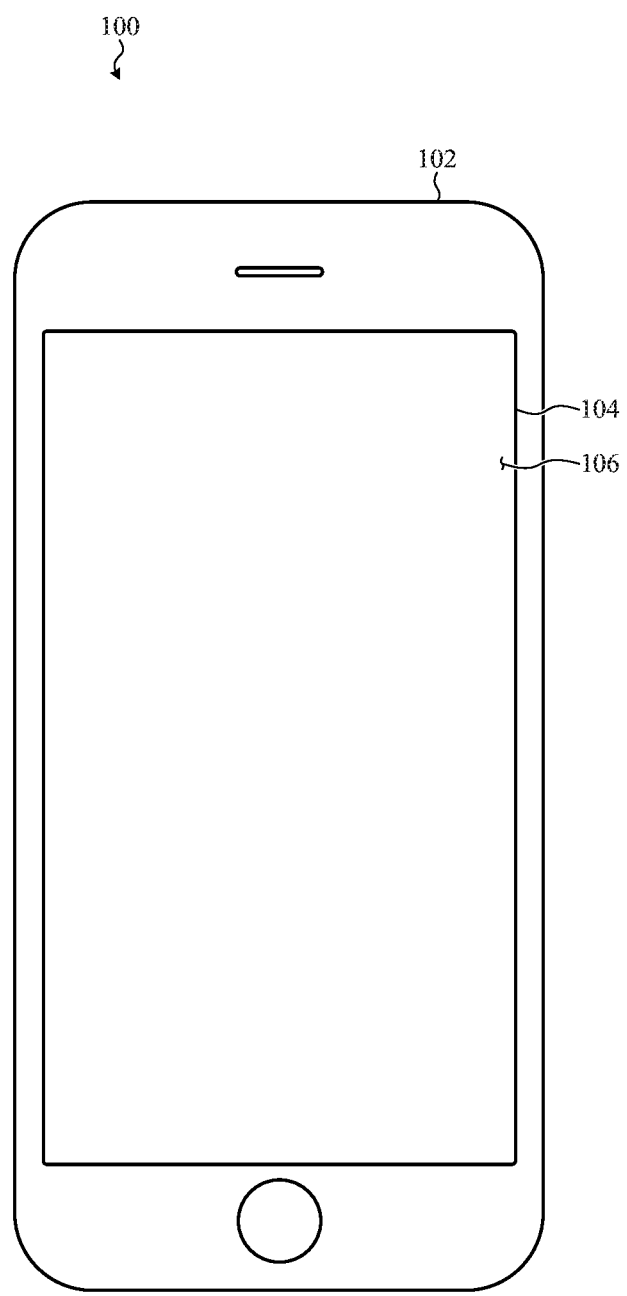
FIG. 1A depicts an electronic device with an input surface configured to receive a force exerted by a user.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference an electronic device including an input surface. The electronic device is configured to measure a magnitude of force exerted on that surface by a user. The electronic device performs an operation based on one or more detected or measured characteristics of the exerted force such as, but not limited to, presence or absence of the exerted force, absolute magnitude of the exerted force, a rate of change of the magnitude of the exerted force, a location of one or more focal points of the exerted force, a change in a location of one or more focal points of the exerted force, a duration of the exerted force, and so on. The electronic device can perform the operation at any suitable time during or after the force is exerted by the user. Such electronic devices include, but are not limited to, portable electronic devices, fixed electronic devices, cellular telephones, tablet computing devices, wearable computing devices, peripheral input devices, industrial or equipment control devices, transportation devices, navigation devices, medical devices, health devices, and so on.

An electronic device, such as described herein, typically incorporates a force-responsive sensor. The force-responsive sensor is coupled, either directly or indirectly, to an input surface of the electronic device. The input surface is positioned and configured to receive a force exerted by the user, which is typically a downward force, although this may not be required; the force may be exerted along any suitable vector relative to the plane of the input surface. The input surface is typically an external surface of the electronic device, such as an outer protective layer positioned above a touch-sensitive display.

The force-responsive sensor can be implemented in any number of ways. For example, the force-responsive sensor can include capacitive plates separated by a dielectric material. Changes in capacitance between the plates can be correlated to a magnitude and/or direction of force exerted on the input surface. In one example, at least one of the capacitive plates is coupled to (or otherwise placed in communication with) the input surface so that the distance between that plate and another capacitive plate changes when the input surface flexes or deforms in response to the force exerted by the user. In this example, the capacitive plates and dielectric material are oriented parallel to the input surface. In this manner, as the magnitude of the force exerted increases, the distance between the capacitive plates decreases, thereby increasing the capacitance between those plates. In another example, the capacitive plates and dielectric material may be oriented perpendicular to the input surface. In this example, as the force exerted increases, the plates arc away from one another, thereby decreasing the capacitance between those plates.

In many embodiments, the force-responsive sensor is segmented. In other words, the force-responsive sensor may include a number of independent force-sensitive elements or structures arranged in a pattern. For example, the force-responsive sensor described above may be implemented with an array of capacitive plate pairs, each associated with a different portion of the input surface. In these embodiments, the force exerted on the input surface by the user affects different force-sensitive elements to different degrees. In these examples, the force-responsive sensor may be configured to calculate or determine a location at which the user exerts the force on the input surface. Additionally or optionally, the force-responsive sensor may be configured to calculate or determine the location and/or magnitude of each of a number of simultaneous forces exerted on the input surface by a user.

In other embodiments, the force-responsive sensor can be implemented in another manner. For example, the force-responsive sensor can include at least one strain-sensitive element. The strain-sensitive element can be coupled to (or otherwise placed in communication with) the input surface so that the strain-sensitive element experiences compression or tension when the input surface flexes or deforms in response to the force exerted by the user. The strain-sensitive elements can be formed, at least in part, from a material that exhibits an electrical resistance that changes as a function of mechanical strain. Such materials include, but are not limited to, peizoresistive materials.

In still further embodiments, the force-responsive sensor can be implemented in other ways including, but not limited to, gas pressure force sensors, optical force sensors, electrical impedance force sensors, contact-area based force sensors, and so on, or any combination thereof or any implementation-appropriate or suitable substitute thereof. As such, it may be appreciated that as used herein, the phrase "force-responsive sensor" refers to an electrical sensor or electrical sensor collection having at least one electrical output that changes with the location and/or magnitude of a force exerted on the force-responsive sensor. Similarly, the phrase "force-sensitive element" refers to a substructure of a force-responsive sensor that may be coupled to an input surface, such as a strain-sensitive element, a capacitive plate, and so on.

Further to the embodiments referenced above, a force-responsive sensor such as described herein is typically associated with at least one electrical circuit. The electrical circuit can include both drive circuitry and/or readout circuitry. The drive circuitry may be used to apply a voltage or a voltage signal to a force-sensitive element and the readout circuitry may be used to detect changes in voltage, current, or another electrical property that changes in a manner that can be correlated to a force exerted on the input surface. In many cases, both the drive circuitry and the readout circuitry can include one or more signal processing stages which may be, but are not limited to, amplifying stages, filtering stages, multiplexing stages, digital-to-analog conversion stages, analog-to-digital conversion stages, comparison stages, feedback stages, and so on.

One or more signal processing stages of either or both the drive circuitry or readout circuitry of a force-responsive sensor can be controlled by a power controller. The power controller can be implemented in any number of suitable ways; in many embodiments, the power controller includes a processor.

The power controller is typically in communication with a touch sensor associated with the input surface, although this may not be required. The touch sensor may be a single-touch or multi-touch sensor that is configured to determine the location (and/or area) of one or more touches on the input surface. The touch sensor can be a capacitive touch sensor, an infrared touch sensor, an ultrasonic touch sensor, a strain-based touch sensor, a resistive touch sensor, an optical touch sensor, or any other suitable touch sensor or combination of touch sensors. The power controller can use information from the touch sensor to modulate, regulate, and/or control the power delivered to or consumed by one or more signal processing stages of either or both the drive circuitry or readout circuitry of the force-responsive sensor.

For example, the touch sensor can send a signal to the power controller that a touch is detected at a particular location of the input surface. In response, the power controller can activate drive circuitry and/or readout circuitry associated with the force-responsive sensor. At a later time, the touch sensor can send a signal to the power controller that the previous touch event has ended. In response, the power controller deactivates drive circuitry and/or readout circuitry associated with the force-responsive sensor. In this manner, the force-responsive sensor may be operated in a more power-efficient manner.

In another example, the power controller can modulate, regulate, and/or control a performance characteristic of one or both of the drive circuitry or readout circuitry of the force-responsive sensor operates. A performance characteristic can be a supply voltage, a supply current, a bias voltage, a bias current, a duty cycle, a sampling rate, and so on. More specifically, in this example, the touch sensor can send a signal to the power controller that a touch is detected at a particular location of the input surface. In response, the power controller can increase a duty cycle of the drive circuitry and increase a sampling rate of the readout circuitry associated with the force-responsive sensor. At a later time, the touch sensor can send a signal to the power controller that the previous touch event has ended. In response, the power controller can lower the duty cycle of the drive circuitry or a sampling rate of the readout circuitry associated with the force-responsive sensor. In this manner, the force-responsive sensor may be operated in a more power-efficient manner.

In yet another example, the power controller may be configured to modify which portions of a segmented force-responsive sensor are active at a given time. More specifically, in this example, the touch sensor can send a signal to the power controller that a touch is detected at a particular location of the input surface. In response, the power controller can activate the drive circuitry and/or readout circuitry associated with segments of the force-responsive sensor (e.g., force-sensitive elements) adjacent to that location. At a later time, the touch sensor can send a signal to the power controller that the previous touch event has ended. In response, the power controller can lower the duty cycle of, or completely disable, the drive circuitry and/or readout circuitry associated with the activated portions force-responsive sensor. In this manner, the force-responsive sensor may be operated in a more power-efficient manner.

In yet another example, the power controller may be configured to modify one or more performance characteristics of portions of a segmented force-responsive sensor based on the location of a force exerted on the input surface. More specifically, as may be appreciated, a force exerted at a corner of an input surface (which may be proximate to a frame or other structure that supports the input surface) may deform the input surface to a lesser degree than the same magnitude of force exerted at a center of the input surface. Accordingly, in certain embodiments, the power controller may vary the duty cycle of the drive circuitry and/or readout circuitry associated with segments of the force-responsive sensor based on the locations of those segments. In other words, segments of the force-responsive sensor that are nearby corners or edges of the input surface may be operated at a higher duty cycle than segments of the force-responsive sensor that are within a center of the input surface. In this example, the touch sensor can send a signal to the power controller that a touch is detected at a particular location of the input surface nearby a corner of the input surface. In response, the power controller can increase the duty cycle of the drive circuitry and/or readout circuitry associated with segments of the force-responsive sensor (e.g., force-sensitive elements) nearby the corner of the input surface to a first level. At a later time, the touch sensor can send a signal to the power controller that the previous touch event has ended. In response, the power controller can lower the duty cycle of or completely disable the drive circuitry and/or readout circuitry associated with the activated portions of the force-responsive sensor. At a later time, the touch sensor may send a signal to the power controller that a touch is detected at a particular location of the input surface nearby a center of the input surface. In response, the power controller can increase the duty cycle of the drive circuitry and/or readout circuitry associated with segments of the force-responsive sensor (e.g., force-sensitive elements) nearby the center of the input surface to a second level. In many cases, the second level is lower than the first level. At a later time, the touch sensor can send a signal to the power controller that the previous touch event has ended. In response, the power controller can lower the duty cycle of, or completely disable, the drive circuitry and/or readout circuitry associated with the activated portions force-responsive sensor. In this manner, the force-responsive sensor may be operated in a more power-efficient manner.

In another example, the power controller can modulate, regulate, and/or control a performance characteristic such as a duty cycle at which one or both the drive circuitry or readout circuitry of the force-responsive sensor operates based on a user preference or an operational setting of the electronic device. More specifically, in this example, the electronic device can communicate to the power controller that high-precision operation of the force-responsive sensor, at the expense of power consumption, is required. In response, the power controller can increase a duty cycle of the drive circuitry and/or readout circuitry associated with the force-responsive sensor. At a later time, the electronic device can send a signal to the power controller that the high-precision operation of the force-responsive sensor is no longer required, and that normal operation of the force-responsive sensor may resume. In response, the power controller can lower the duty cycle of the drive circuitry and/or readout circuitry associated with the force-responsive sensor.

These and other embodiments are discussed below with reference to FIGS. 1-7. However, those skilled in the art will readily appreciate that the detailed description given herein with respect to these figures is for explanation only and should not be construed as limiting.

FIG. 1A shows an electronic device 100 that can include a segmented force-responsive sensor (herein, "force sensor"). Each segment of the force sensor includes at least one force-sensitive element.

The electronic device 100 includes a housing 102 to retain, support, and/or enclose various components of the electronic device 100, such as a display 104. The display 104 may be any suitable display element. For example, the display 104 may include a stack of multiple layers including, for example, and in no particular order: an organic light emitting diode layer, a cover layer, a touch input layer, and so on. Other embodiments can implement the display 104 in a different manner, such as with liquid crystal display technology, electronic ink technology, quantum dot technology, and so on. In many embodiments, a protective outer layer of the display 104 defines an input surface 106.

The various layers of the display 104, regardless of the implementation-specific display technology selected for a particular embodiment, may be adhered together with an optically transparent adhesive and/or may be supported by a common frame such that the layers abut one another. A common frame may extend around a perimeter, or a portion of the perimeter, of the layers, may be segmented around the perimeter, a portion of the perimeter, or may be coupled to the various layers of the display 104 in another manner.

The common frame can be made from any suitable material such as, but not limited to: metal, plastic, ceramic, acrylic, and so on. The common frame may be a multi-purpose component serving an additional function such as, but not limited to: providing an environmental and/or hermetic seal to one or more components of the display 104 or the electronic device 100; providing structural support to the housing 102; providing pressure relief to one or more components of the display 104 or the electronic device 100; providing and defining gaps between one or more layers of the display 104 for thermal venting and/or to permit flexing of the layers in response to a force applied to the input surface 106; and so on.

In some embodiments, the layers of the display 104 may be attached or deposited onto separate substrates that may be laminated or bonded to each other. The display 104 may also include or be positioned adjacent to other layers suitable for improving the structural or optical performance of the display 104, including, but not limited to, a cover glass sheet, polarizer sheets, color masks, and the like. Additionally, the display 104 may include a touch sensor (not shown) for determining the location of one or more touches on the input surface 106 of the electronic device 100. In many examples, the touch sensor is a capacitive touch sensor configured to detect the location and/or area of one or more touches of a user's finger and/or a passive or active stylus on the input surface 106.

The electronic device 100 can also include a processor, memory, power supply and/or battery, network connections, sensors, input/output ports, acoustic elements, haptic elements, digital and/or analog circuits for performing and/or coordinating tasks of the electronic device 100, and so on. For simplicity of illustration, the electronic device 100 is depicted in FIG. 1 without many of these elements, each of which may be included, partially and/or entirely, within the housing 102 and may be operationally or functionally associated with, or coupled to, the display 104.

Furthermore, although illustrated as a cellular phone, the electronic device 100 can be another electronic device that is either stationary or portable, taking a larger or smaller form factor than illustrated. For example, in certain embodiments, the electronic device 100 can be a laptop computer, a tablet computer, a cellular phone, a wearable device, a health monitoring device, a home or building automation device, a home or building appliance, a craft or vehicle entertainment, control, and/or information system, a navigation device, and so on.

Figure 1B:
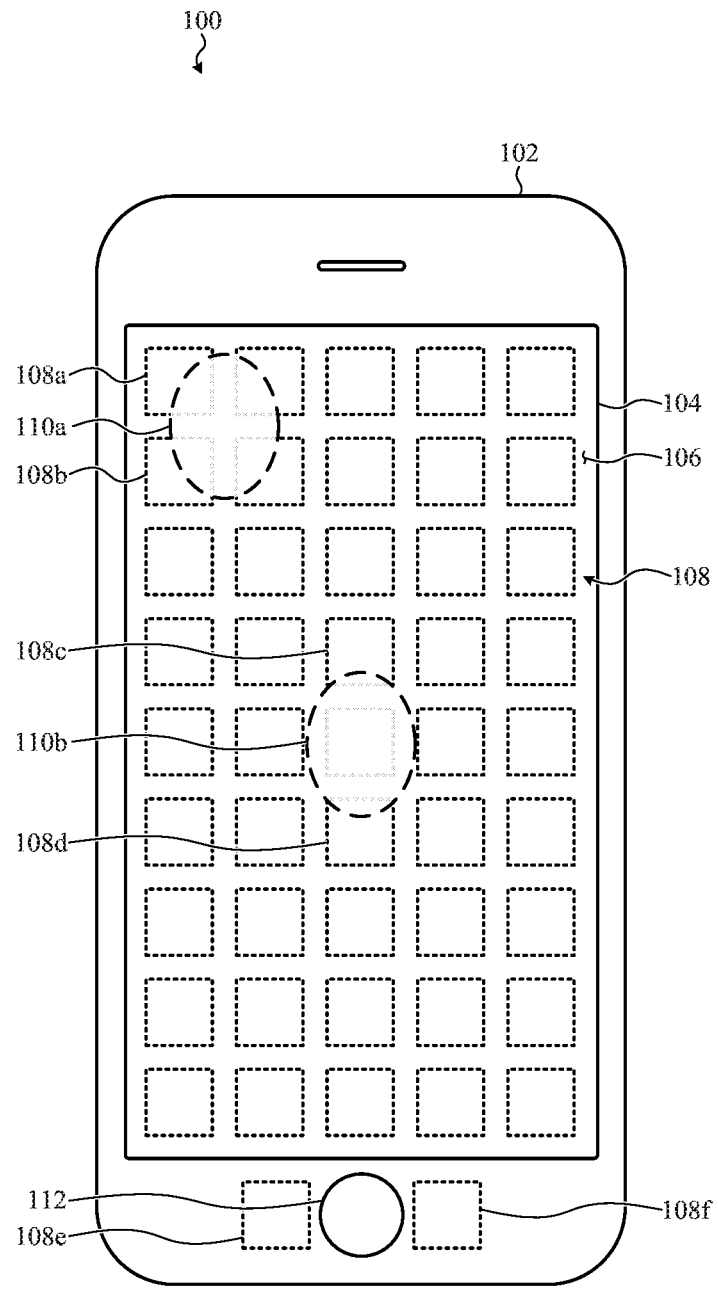
FIG. 1B depicts the electronic device of FIG. 1A, showing a force-responsive sensor coupled to the input surface.

As noted above, the force sensor of the electronic device 100 is coupled to the display 104. For example, FIG. 1B shows a force sensor including an array of force-sensitive elements 108 distributed in a pattern below the input surface 106. In one example, each force-sensitive element of the array of force-sensitive elements 108 is a strain-sensitive element.

The array of force-sensitive elements 108 can be distributed in any suitable manner. For example, as illustrated, the array of force-sensitive elements 108 shown in FIG. 1 is depicted as an evenly-spaced grid of forty-five force-sensitive elements covering a rectangular area of the input surface 106.

The force sensor is typically associated with at least one electrical circuit (not shown). As noted above, the electrical circuit can include both drive circuitry and/or readout circuitry. The drive circuitry may be used to apply an electrical signal (e.g., voltage signal) to one or more force-sensitive elements of the array of force-sensitive elements 108 and the readout circuitry may be used to detect changes in voltage, current, or another electrical property of that force-sensitive elements of the array of force-sensitive elements 108 that changes in a manner that can be correlated to a force exerted on the input surface. In many cases, both the drive circuitry and the readout circuitry can include one or more signal processing stages which may be, but are not limited to, amplifying stages, filtering stages, multiplexing stages, digital-to-analog conversion stages, analog-to-digital conversion stages, comparison stages, feedback stages, and so on.

As noted with respect to other embodiments described herein, one or more signal processing stages of either or both the drive circuitry and readout circuitry of a force sensor can be controlled by a power controller (not shown). The power controller can be implemented in any number of suitable ways; in many embodiments, the power controller includes at least one processor in communication with a processor of the electronic device 100.

As noted above, the power controller is typically in communication with a touch sensor (not shown) associated with the input surface, although this may not be required. The power controller can use information from the touch sensor to modulate, regulate, and/or control the power delivered to or consumed by one or more signal processing stages of either or both the drive circuitry or readout circuitry of the force sensor.

For example, the power controller can receive a signal from the touch sensor that a touch event 110a is detected nearby a corner of the input surface 106. Due to mechanical rigidity of the housing 102 and/or the input surface 106 at this location, the power controller may respond to the signal from the touch controller by increasing a duty cycle of one or more force-sensitive elements nearby that corner, such as the force-sensitive element 108a and the force-sensitive element 108b.

In another example, the power controller can receive a signal from the touch sensor that a touch event 110a is detected nearby a corner of the input surface 106. Due to mechanical rigidity of the housing 102 and/or the input surface 106 at this location, the power controller may respond to the signal from the touch controller by increasing an amplifier bias of one or more force-sensitive elements nearby that corner, such as the force-sensitive element 108a and the force-sensitive element 108b.

In this example, the duty cycle of the force-sensitive element 108a and the duty cycle of the force-sensitive element 108b may be the same and may be increased by the power controller by the same amount. In other embodiments, the duty cycle of the force-sensitive element 108a may be increased to a greater amount than the duty cycle of the force-sensitive element 108b. Increasing the duty cycle (s) in this manner allows the force sensor to operate only in response to the touch event 110a. As a result, the force sensor can be operated in a power-efficient manner without sacrificing signal quality, precision, or accuracy.

In another example, the power controller can receive a signal from the touch sensor that a touch event 110b is detected while a power supply, such as an external power supply, is attached to the electronic device 100. Due to the increased power available with the power supply attached, the power controller may respond to the signal from the touch controller by changing a duty cycle of one or more force-sensitive elements, such as the force-sensitive element 108c and the force-sensitive element 108d. In some examples, changing the duty cycle of the one or more force-sensitive elements can compensate for supply-line noise introduced by the power supply.

In another example, the power controller can receive a signal from the touch sensor that a touch event 110b is detected nearby a center of the input surface 106. Due to relative flexibility of the input surface 106 at this location, the power controller may respond to the signal from the touch controller by changing a duty cycle of one or more force-sensitive elements nearby that center, such as the force-sensitive element 108c and the force-sensitive element 108d.

In this example, the duty cycle of the force-sensitive element 108c and the duty cycle of the force-sensitive element 108d may be the same and may be increased by the power controller by the same amount. In other embodiments, the duty cycle of the force-sensitive element 108c may be increased to a greater amount than the duty cycle of the force-sensitive element 108d. Increasing the duty cycle (s) in this manner allows the force sensor to operate in response to the touch event 110b in a more power efficient manner without sacrificing signal quality, precision, or accuracy. In some cases, the duty cycle(s) associated with the touch event 110a is different from the duty cycle(s) associated with the touch event 110b.

In other cases, the force sensor may be positioned partially nearby a cutout 112 within the housing 102. The cutout 112 may define an aperture in the input surface 106, or may define an aperture in a layer below the input surface 106 or the display 104. The cutout 112 may take any number of suitable shapes and can be associated with an electronic component of the electronic device 100 such as, but not limited to, a button, a fingerprint sensor, a touch sensor, a force sensor, a rotating element, a camera element, a data port, or any other suitable element or combination of elements.

In these embodiments, the power controller can receive a signal from the touch sensor, or another component of the electronic device 100 that a user is touching or exerting force nearby the cutout 112. Due to mechanical rigidity of the housing 102 and/or the input surface 106 nearby the cutout 112, the power controller may respond to the signal from the touch controller by increasing a duty cycle of one or more force-sensitive elements nearby that corner, such as the force-sensitive element 108e and the force-sensitive element 108f. In other cases, the touch sensor can be disposed relative to another component or surface of the electronic device 100.

In this example, the duty cycle of the force-sensitive element 108d and the duty cycle of the force-sensitive element 108e may be the same and may be increased by the power controller by the same amount. In other embodiments, the duty cycle of the force-sensitive element 108e may be increased to a greater amount than the duty cycle of the force-sensitive element 108f. Increasing the duty cycle (s) in this manner allows the force sensor to operate in response to a touch event nearby a cutout 112 in a more power efficient manner without sacrificing signal quality, precision, or accuracy.

For simplicity of illustration, FIGS. 1A-1B is depicted without many portions of the force-responsive sensor which may be included, partially and/or entirely, within the housing 102.

Further, although many examples are provided above, it may be appreciated that a force sensor such as depicted in FIG. 1B can be implemented or operated in any number of suitable ways. For example, the force-responsive sensor can be implemented in any number of suitable ways. One such implementation is shown in FIG. 2, although many other implementations are possible.

Figure 2:
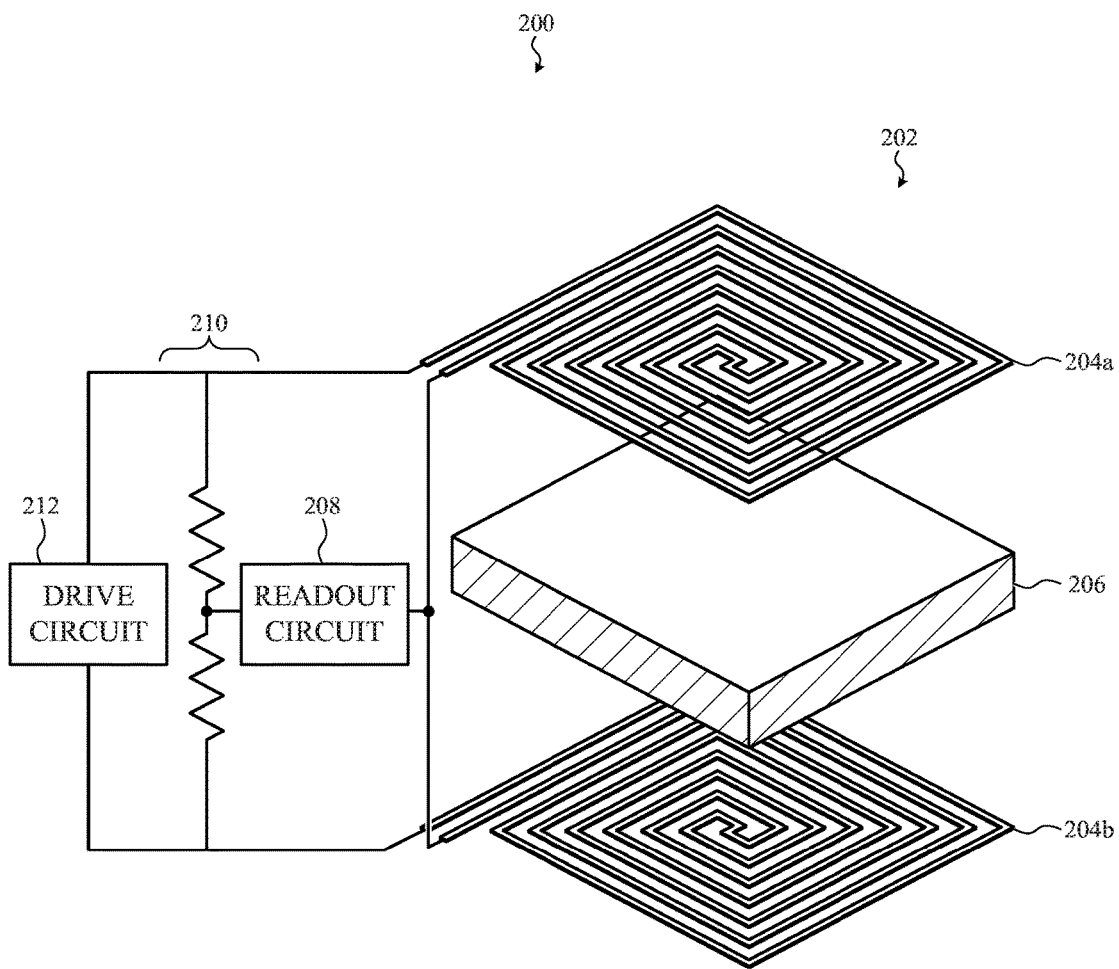
FIG. 2 depicts a simplified example of a force-sensitive element that can be associated with a force-responsive sensor, such as the force-responsive sensor of FIG. 1B.

FIG. 2 depicts a simplified view of one example of a force sensor 200. The force sensor 200 includes a force-sensitive element 202. The force-sensitive element 202 may be defined by a pair of resistive structures (labeled as an upper strain sensor 204a, and a lower strain sensor 204b) electrically coupled into a balancing network configuration. The force sensor 200 can be used by an electronic device, such as the electronic device 100 in FIG. 1, to gather pressure or exerted force information from a user of the electronic device. For example, in one embodiment, the force sensor 200 can be coupled to the input surface 106 as shown in FIG. 1. When a user exerts a force on the input surface 106, the input surface 106 may flex in response. Flexing of the input surface 106 causes the resistive structures to experience compression or tension. The electrical resistance of either or both of the resistive structures may change as a result of the compression or tension.

In this embodiment, the resistive structures can be formed from any number of suitable materials that exhibit a change in resistance when strained. Such materials include, but are not limited to: nickel, constantan, karma, silicon, polysilicon, gallium alloys, isoelastic alloys, carbon nanoparticle composites, carbon nanotube composites, and so on.

In some embodiments, a resistive structure may be optically transparent. In these cases, the resistive structure may be formed from a material such as, but not limited to: indium-tin oxide, carbon nanotubes, metal nanowires, carbon nanoparticle composites, carbon nanotube composites, or any combination thereof. In many cases, the resistive structure is formed from a material having a known or determinable gauge factor. In many cases, the gauge factor may be greater than 1.0.

The force-sensitive element 202 is illustrated in an exploded view. In an implementation of the illustrated embodiment, the upper strain sensor 204a and the lower strain sensor 204b are disposed onto opposite faces of the substrate 206 using a suitable disposition technique such as, but not limited to: vapor deposition, printing, roll-to-roll processing, gravure, pick and place, adhesive, mask-and-etch, and so on. In some cases, the upper strain sensor 204a and the lower strain sensor 204b are formed in two stages of the same manufacturing process. In other cases, the upper strain sensor 204a and the lower strain sensor 204b are formed simultaneously onto the substrate.

The substrate 206 can be configured to flex in a free, controlled, or limited manner. For example, the substrate 206 may be supported along its perimeter by a chassis or frame. The substrate 206 may be single layer or multi-layer including materials such as, but not limited to: plastic, metal, ceramic, glass, polyamide, polyethylene terephthalate, or any combination thereof. The substrate 206 may have any suitable thickness, but in many embodiments, the substrate 206 is less than 1 mm thick. In further embodiments, the substrate 206 may be several microns thick. It is appreciated that the embodiment depicted is not drawn to scale.

The substrate 206 can be transparent, translucent, or opaque. Typically the substrate 204 is electrically insulating, although this may not be required of all embodiments. The substrate 206 may be a multi-purpose element. For example, the substrate 206 may also function as an optical reflector and/or as an electromagnetic or capacitive shield. The substrate 206 may be partially or entirely electrically isolated, biased to a specific voltage, floating, or grounded. The substrate 206 may be a polymer layer with high thermal conductivity. The thermal conductivity of the polymer layer can be adjusted and/or tuned by doping the polymer with thermally conductive particles, such as boron nitride or glass particles, and the like.

In some cases, the force sensor 200 can include more than one force-sensitive element, such as shown in FIG. 1. In such an embodiment, different force-sensitive elements may be made from different materials and/or may have different optical properties. For example, a force-sensitive element adjacent to a perimeter of an input surface, such as the input surface 106 shown in FIG. 1, may be optically translucent or opaque whereas a force-sensitive element nearby a geometric center of the input surface may be optically transparent.

The upper strain sensor 204a and the lower strain sensor 204b are aligned with one another and take the same shape. As illustrated, the upper strain sensor 204a is defined by an electrically-conductive trace that has a clockwise rectangular spiral shape that doubles-back upon its path once the center of the rectangular spiral is reached. The lower strain sensor 204b is also defined by an electrically-conductive trace that has a clockwise rectangular spiral shape that doubles-back upon its path once the center of the rectangular spiral is reached. In the illustrated embodiment, the lower strain sensor 204b mirrors the path of the upper strain sensor 204a across the plane of the substrate 206. In other cases, an electrically-conductive trace can have another shape that doubles back one or more times from one or more central or non-central locations.

Although the upper strain sensor 204a and the lower strain sensor 204b are shown taking a clockwise-oriented rectangular spiral shape that doubles-back, such a configuration is merely an example, and other shapes and trace paths are contemplated.

The upper strain sensor 204a and the lower strain sensor 204b are coupled to a readout circuit 208. The readout circuit 208 can be implemented in any number of suitable ways; one simplified example schematic, including a voltage divider, is depicted. The readout circuit 208 as illustrated includes two reference resistors 210 connected in series. The two reference resistors 210 have a known resistance and are coupled to the upper strain sensor 204a and the lower strain sensor 204b in a balancing network configuration, such as a Wheatstone bridge configuration.

The two reference resistors 210 may be independent high-precision resistors, or may be formed as an array or network of independent resistors. In some cases, the two reference resistors 210 may be variable; the resistance of the two reference resistors 210 may be changed and/or adjusted dynamically.

The upper strain sensor 204a and the lower strain sensor 204b are also coupled to a drive circuit 212 which may apply an electrical signal or an electrical bias to the balancing network. The readout circuit 208 thereafter measures an output voltage of the balancing network. In many cases, the readout circuit 208 and the drive circuit 212 may be coupled to a power controller (not shown), such as described with respect to other embodiments presented here.

It may be appreciated that the foregoing description of FIG. 2, and various alternatives thereof and variations thereto are presented, generally, for purposes of explanation, and to facilitate a thorough understanding of various possible configurations of a force-responsive sensor as contemplated herein. However, it will be apparent to one skilled in the art that some of the specific details presented herein may not be required in order to practice a particular described embodiment, or an equivalent thereof.

Thus, the foregoing and following descriptions and specific embodiments are understood to be presented for the limited purposes of illustration and description. These descriptions are not target to be exhaustive or to limit the disclosure to the precise forms recited herein. To the contrary, it will be apparent to one of ordinary skill in the art that many modifications and variations are possible in view of the above teachings. Particularly, it may be understood that the force sensor, power controller, and/or the force-sensitive element depicted in FIG. 2 can be implemented in a number of suitable ways.

Independent of the particular implementation selected for an embodiment contemplated herein, it may be appreciated that a force sensor may, generally and broadly, include drive circuitry, a force-sensitive element, readout circuitry, and a power controller. Such an implementation is depicted in FIG. 3A.

Figure 3A:
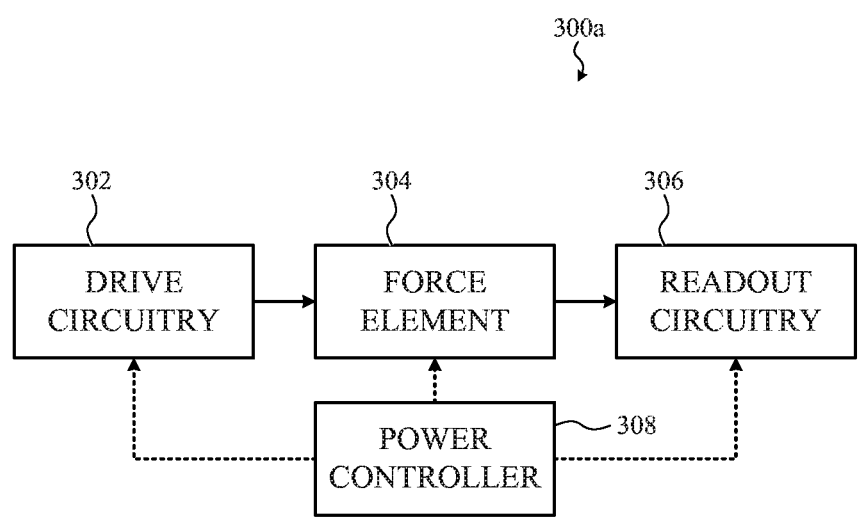
FIG. 3A depicts a simplified signal flow diagram of a force-responsive sensor that may be coupled to the input surface of FIG. 1.

In particular, FIG. 3A depicts a simplified signal flow diagram of a force-responsive sensor. The force-responsive sensor 300a includes a drive circuitry 302, a force-sensitive element collection 304, a readout circuitry 306, and a power controller 308.

The drive circuitry 302 maybe configured to generate or convey an electrical signal (the "drive signal") to at least one force-sensitive element of the force-sensitive element collection 304. The drive signal can be any suitable signal including, but not limited to, a voltage bias, a voltage signal, a current signal, and so on.

The drive circuitry 302 can be implemented in any number of suitable ways. In many examples, the drive circuitry 302 includes one or more signal processing stages that may be used to generate, augment, or smooth the drive signal. For example, the drive circuitry 302 can include one or more of, without limitation, amplifying stages, filtering stages, multiplexing stages, digital-to-analog conversion stages, analog-to-digital conversion stages, comparison stages, feedback stages, and so on.

The drive circuitry 302 can be implemented with analog circuit components, digital circuit components, passive circuit components, and/or active circuit components. In some examples, the drive circuitry 302 is implemented as a single integrated circuit.

The drive signal output from the drive circuitry 302 is conveyed to the force-sensitive element collection 304. The force-sensitive element collection 304 can include any number of force-sensitive elements such as, but not limited to, strain sensitive elements such as described above with respect to FIGS. 1B-2. In many cases, the force-sensitive element collection 304 is arranged in a pattern, although this may not be required. The drive signal can be received by one or more force-sensitive elements.

Once the drive signal is applied to the at least one force-sensitive element of the force-sensitive element collection 304, an output of the at least one force-sensitive element can be received by the readout circuitry 306.

The readout circuitry 306 maybe configured to receive or obtain an electrical signal (the "sense signal") from at least one force-sensitive element of the force-sensitive element collection 304. The sense signal can be any suitable signal including, but not limited to, a voltage bias, a voltage signal, a current signal, and so on.

As with the drive circuitry 302, the readout circuitry 306 can be implemented in any number of suitable ways. In many examples, the readout circuitry 306 includes one or more signal processing stages that may be used to receive, amplify, augment, or smooth the sense signal. For example, the readout circuitry 306 can include one or more of, without limitation, amplifying stages, filtering stages, multiplexing stages, digital-to-analog conversion stages, analog-to-digital conversion stages, comparison stages, feedback stages, and so on.

The readout circuitry 306 can be implemented with analog circuit components, digital circuit components, passive circuit components, and/or active circuit components. In some examples, the readout circuitry 306 is implemented as a single integrated circuit.

The power controller 308 can be optionally coupled to one or more of the drive circuitry 302, the force-sensitive element collection 304, and the readout circuitry 306. As noted with respect to other embodiments described herein, the power controller 308 can be configured to selectively enable or disable the drive circuitry 302 and/or the readout circuitry 306 when such circuitry is not in use. In other examples, the power controller 308 is configured to modify a duty cycle of the drive circuitry 302 and/or the readout circuitry 306. In other examples, the power controller 308 can be configured to modify which force-sensitive elements of the force-sensitive element collection 304 are enabled at a particular time.

In many cases, the power controller 308 may change the duty cycle of the drive circuitry 302 and/or the readout circuitry 306 in order to control the average power consumption of the force-responsive sensor 300a. In other cases, the power controller 308 may change the voltage of the drive circuitry 302 and/or a current bias of readout circuitry 306 in order to control the average power consumption of the force-responsive sensor 300a.

The power controller 308 may be optionally configured to receive signals from other electronic device or electronic components. For example, the power controller 308 may be configured to receive a signal from a touch controller, a processor, a wireless communication module, and so on. In response to the received signals, the power controller 308 may change the duty cycle of the drive circuitry 302 and/or the readout circuitry 306 in order to control the average power consumption of the force-responsive sensor 300a.

The foregoing description of the generalized embodiment depicted in FIG. 3A is provided to facilitate a general understanding of the interoperation of various components of the force-responsive sensor 300a. As such, it may be appreciated that the individual components of the force-responsive sensor 300a, such as the drive circuitry 302, the force-sensitive element collection 304, and the readout circuitry 306 can be implemented in any number of suitable ways, which may vary from embodiment to embodiment. One example embodiment is presented in FIG. 3B.

Figure 3B:
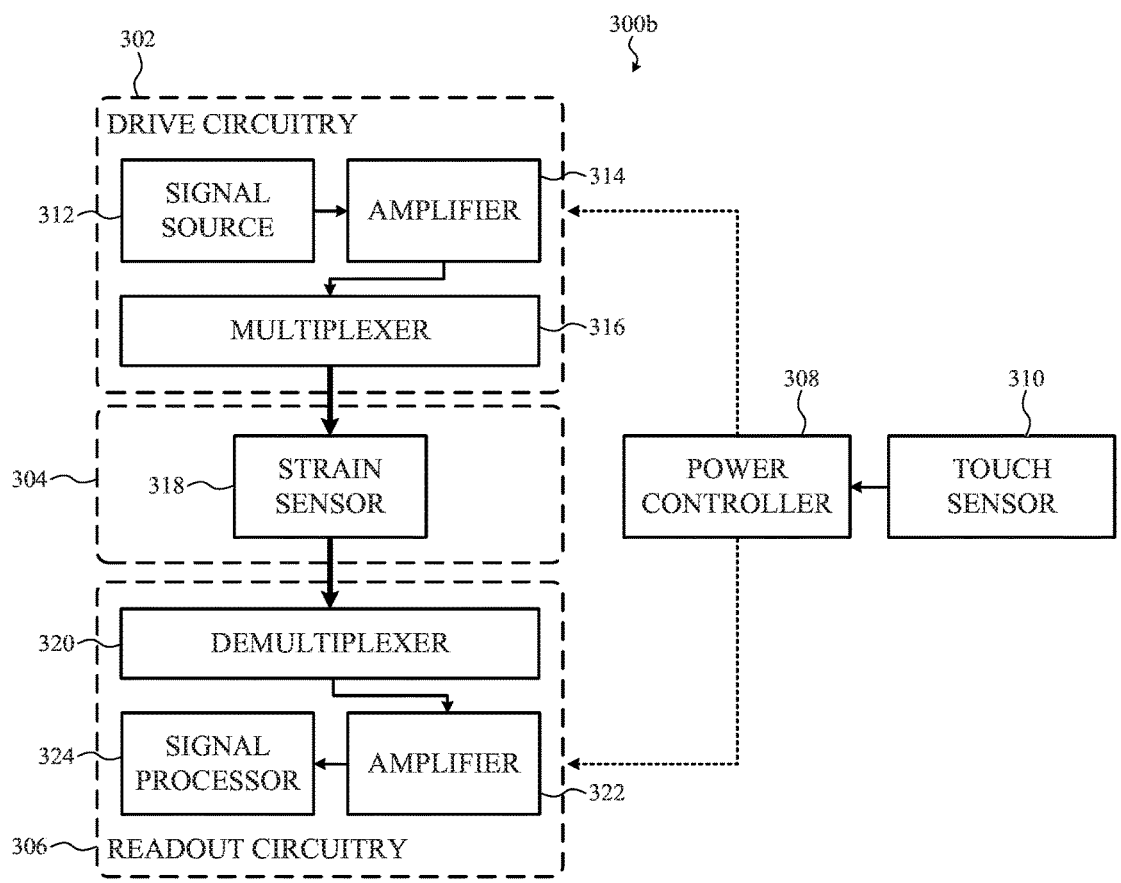
FIG. 3B depicts another simplified signal flow diagram of a force-responsive sensor that may be coupled to the input surface of FIG. 1, specifically showing a power controller that may be optionally coupled to a drive circuit and/or a readout circuit of the force-responsive sensor.

In particular, FIG. 3B depicts a simplified signal flow diagram of a force-responsive sensor 300b. As with the embodiment depicted in FIG. 3A, force-responsive sensor 300b includes a drive circuitry 302, a force-sensitive element collection 304, a readout circuitry 306, and a power controller 308. In this embodiment, the power controller 308 may be configured to receive one or more signals from a touch sensor 310.

The drive circuitry 302 maybe configured to generate or convey the drive signal to at least one force-sensitive element of the force-sensitive element collection 304. As with other embodiments described herein, the drive signal can be any suitable signal including, but not limited to, a voltage bias, a voltage signal, a current signal, and so on.

The drive circuitry 302 can be implemented in any number of suitable ways. In many examples, the drive circuitry 302 includes one or more signal processing stages that may be used to generate, augment, or smooth the drive signal. In particular, the drive circuitry 302 can include a signal source 312, an amplifier 314, and a multiplexer 316.

The signal source 312 can be implemented with any suitable electronic component or collection of components configured to generate a drive signal. The drive signal may be a regulated voltage bias signal, a variable voltage signal, a chirp signal, a pulse-width modulated signal, or any other number of suitable signals.

The signal source 312 can be implemented with analog circuit components, digital circuit components, passive circuit components, and/or active circuit components. In some examples, the signal source 312 is implemented as a single integrated circuit. In some embodiments, one or more functions or outputs of the signal source 312 can be partially or entirely implemented in software. In some embodiments, the signal source 312 can be operated with duty cycle control.

An output of the signal source 312 is coupled to an input of the amplifier 314. The amplifier 314 can be implemented with any suitable electronic component or collection of components configured to amplify an analog or digital signal. In some cases, the amplifier 314 can also include one or more filtering stages that are configured to remove certain frequency components of the drive signal.

As with other elements of the drive circuitry 302, the amplifier 314 can be implemented with analog circuit components, digital circuit components, passive circuit components, and/or active circuit components. In some examples, the amplifier 314 is implemented as a single integrated circuit. In some embodiments, one or more functions or outputs of the amplifier 314 can be partially or entirely implemented in software. An output of the amplifier 314 is coupled to an input of the multiplexer 316.

The multiplexer 316 can be implemented with any suitable electronic component or collection of components configured to distribute an input signal to one or more of several outputs.

As with other elements of the drive circuitry 302, the multiplexer 316 can be implemented with analog circuit components, digital circuit components, passive circuit components, and/or active circuit components. In some examples, the multiplexer 316 is implemented as a single integrated circuit. In some embodiments, one or more functions or outputs of the multiplexer 316 can be partially or entirely implemented in software. The output of the multiplexer 316 may be a signal bus collection that connects to each force-sensitive element of the force-sensitive element collection 304.

The force-sensitive element collection 304 can include any number of force-sensitive elements. As illustrated, the force-sensitive element collection 304 contains at least one strain sensor, identified as the strain sensor 318. The strain sensor 318 can be a strain sensor such as described above with reference to FIG. 2. The output of the force-sensitive element collection 304 may be a signal bus collection coupled to the readout circuitry 306.

The readout circuitry 306 can receive the output of the force-sensitive element collection 304 with a multiplexer 320. The multiplexer 320 can be implemented with analog circuit components, digital circuit components, passive circuit components, and/or active circuit components. In some examples, the multiplexer 320 is implemented as a single integrated circuit.

In some embodiments, one or more functions or outputs of the multiplexer 320 can be partially or entirely implemented in software. The output of the multiplexer 320 may be received by an amplifier 322.

The amplifier 322 can be implemented with any suitable electronic component or collection of components configured to amplify an analog or digital signal. In some cases, the amplifier 322 can also include one or more filtering stages that are configured to remove certain frequency components of the sense signal.

As with other elements of the readout circuitry 306, the amplifier 322 can be implemented with analog circuit components, digital circuit components, passive circuit components, and/or active circuit components. In some examples, the amplifier 322 is implemented as a single integrated circuit. In some embodiments, one or more functions or outputs of the amplifier 322 can be partially or entirely implemented in software. An output of the amplifier 322 can be coupled to a signal processor 324.

The signal processor 324 can be implemented with any suitable electronic component or collection of components configured to process, or otherwise extract, information from an analog or digital signal.

As with other elements of the readout circuitry 306, the signal processor 324 can be implemented with analog circuit components, digital circuit components, passive circuit components, and/or active circuit components. In some examples, the signal processor 324 is implemented as a single integrated circuit. In some embodiments, one or more functions or outputs of the signal processor 324 can be partially or entirely implemented in software.

The power controller 308 can be optionally coupled to one or more portions of the drive circuitry 302. For example, one or more of the signal source 312, the amplifier 314, and the multiplexer 316 can be coupled to the power controller 308. The power controller 308 can be configured to selectively enable or disable these portions the drive circuitry 302 that portion is not in use. In other examples, the power controller 308 is configured to modify a duty cycle of these portions of the drive circuitry 302. In many cases, the power controller 308 may change the duty cycle of one or more components of the drive circuitry 302 in order to control the average power consumption of the force-responsive sensor 300b.

In many cases, the power controller 308 can operate each component of the drive circuitry 302 at the same duty cycle, although this may not be required. For example, the power controller 308 can operate the amplifier 314 at one duty cycle while operating the multiplexer at yet another duty cycle.

The power controller 308 can be optionally coupled to one or more portions of the readout circuitry 306. For example, one or more of the multiplexer 320, the amplifier 322, and the signal processor 324 can be coupled to the power controller 308. The power controller 308 can be configured to selectively enable or disable these portions the readout circuitry 306 that portion is not in use. In other examples, the power controller 308 is configured to modify a duty cycle of these portions of the readout circuitry 306. In many cases, the power controller 308 may change the duty cycle of one or more components of the readout circuitry 306 in order to control the average power consumption of the force-responsive sensor 300b.

In many cases, the power controller 308 can operate each component of the readout circuitry 306 at the same duty cycle, although this may not be required. For example, the power controller 308 can operate the amplifier 314 at one duty cycle while operating the multiplexer at yet another duty cycle.

As noted with respect to other embodiments described herein, the power controller 308 may be optionally configured to receive signals from other electronic device or electronic components. For example, the power controller 308 may be configured to receive a signal from a touch controller, a processor, a wireless communication module, and so on. In response to the received signals, the power controller 308 may change the duty cycle of the drive circuitry 302 and/or the readout circuitry 306 in order to control the average power consumption of the force-responsive sensor 300b.

Further to the embodiments referenced above, the power controller 308 may be configured to increase, decrease, or otherwise change the duty cycle of any component associated with the force-responsive sensor 300b. For example, the power controller 308 can increase a duty cycle of the amplifier 314 in response to a signal from the touch sensor 310 that a user is touching an input surface associated with the force-sensitive element collection 304. In another example, the power controller 308 can decrease a duty cycle of the amplifier 322 in response to a signal from the touch sensor 310 that a user is no longer touching the input surface. The power controller 308 can modify which force-sensitive elements of the force-sensitive element collection 304 are active, which portions of the drive circuitry 302 and the readout circuitry 306 are active, the duty cycle of various portions of the drive circuitry 302 and the readout circuitry 306 and so on. In other words, the power controller 308 may be configured to operate in any number of suitable ways to control and/or regulate the power consumption of the force-responsive sensor 300b.

Accordingly, it may be appreciated that the foregoing description of FIGS. 3A-3B, and various alternatives thereof and variations thereto are presented, generally, for purposes of explanation, and to facilitate a thorough understanding of various possible configurations of a force-responsive sensor as contemplated herein. However, it will be apparent to one skilled in the art that some of the specific details presented herein may not be required in order to practice a particular described embodiment, or an equivalent thereof.

Thus, the foregoing and following descriptions and specific embodiments are understood to be presented for the limited purposes of illustration and description. These descriptions are not target to be exhaustive or to limit the disclosure to the precise forms recited herein. To the contrary, it will be apparent to one of ordinary skill in the art that many modifications and variations are possible in view of the above teachings.

In particular, independent of the implementation selected for an embodiment contemplated herein, it may be appreciated that the power consumption of a force sensor may, generally and broadly, be controlled and/or regulated by a power controller (or another suitable equivalent component or collection of components) configured to selectively enable, disable, and/or control: the duty cycle of one or more portions of that force sensor; a voltage amplitude associated with one or more portions of that force sensor; a current amplitude associated with one or more portions of that force sensor; a current or voltage bias associated with one or more portions of that force sensor; and so on.

For example, FIGS. 4-7 each depict example operations of such methods of regulating the power consumption of a force-responsive sensor.

Figure 4:
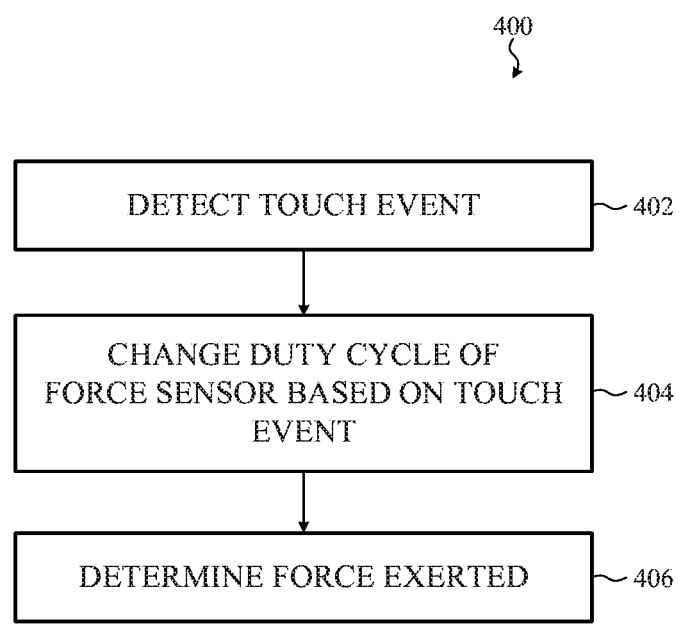
FIG. 4 is a simplified flow chart that illustrates example operations of a method of regulating power consumption of a force-responsive sensor by modifying a performance characteristic (e.g., duty cycle) of the force-responsive sensor based on a detected touch event.

FIG. 4 is a simplified flow chart that illustrates example operations of a method of regulating power consumption of a force-responsive sensor by modifying a duty cycle of the force-responsive sensor based on a detected touch event. In many examples, the method 400 can be performed by a processor within an electronic device, such as the electronic device 100 depicted in FIG. 1. More particularly, the method 400 can be performed by a power controller, such as the power controller 308 depicted in FIGS. 3A-3B.

The method 400 begins at operation 402 in which a touch event is detected. A touch event may be a single-touch event or a multi-touch event. In many examples, the touch event is detected by a touch sensor, such as a capacitive touch sensor.

Next, at operation 404, a duty cycle of a force sensor is changed based on the touch event detected in operation 402.

The duty cycle of the force sensor may be any duty cycle associated with the force sensor, or a component of the force sensor. For example, the duty cycle may be a duty cycle associated with a drive circuitry of the force sensor. In another example, the duty cycle may be a duty cycle associated with a readout circuitry of the force sensor. In yet another example, the duty cycle may be associated with a subcomponent or submodule of a drive circuitry or readout circuitry of the force sensor such as, but not limited to, one or more signal processing stages which may be, amplifying stages, filtering stages, multiplexing stages, digital-to-analog conversion stages, analog-to-digital conversion stages, comparison stages, feedback stages, and so on.

The duty cycle may be changed, based on the touch event, in any number of suitable ways. For example, the duty cycle can be increased if the touch event is associated with an edge or corner of an input surface. The duty cycle can be decreased if the touch event is of a particular touch event type. For example, if the touch event is a gesture (e.g., slide, pinch, rotate, expand, and so on), force detection may not be required and the duty cycle can be decreased.

In many cases, the duty cycle of different components of the force sensor can be changed differently and/or based on different characteristics of the touch event such as, but not limited to, location of the touch event, whether the touch event is a single-touch or multi-touch event, whether the touch event is associated with a gesture, whether the touch event corresponds to an expected input or interaction with a virtual user interface, and so on. For example, an amplifier associated with a drive circuitry may have a different duty cycle than an amplifier associated with a readout circuitry.

Next, the method 400 can continue to operation 406 at which a force exerted may be determined from one or more outputs of the force sensor.

In one specific example, the touch event detected may be associated with a user's interaction with an interface shown on a display. More specifically, the touch event may be the result of the user touching a virtual button presented on a display. In this circumstance, it may not be required to detect force with high precision and as such, the duty cycle of the force sensor may be reduced by the power controller in order to conserve power.

In another example, the touch event detected may be associated with a user's interaction with a force-responsive interface item shown on a display. More specifically, the touch event may be the result of the user interacting with a drawing or sculpting application. In this circumstance, it may be preferred to detect force with high precision and as such, the duty cycle of the force sensor may be increased by the power controller in order to ensure high-precision operation of the force sensor.

Figure 5:
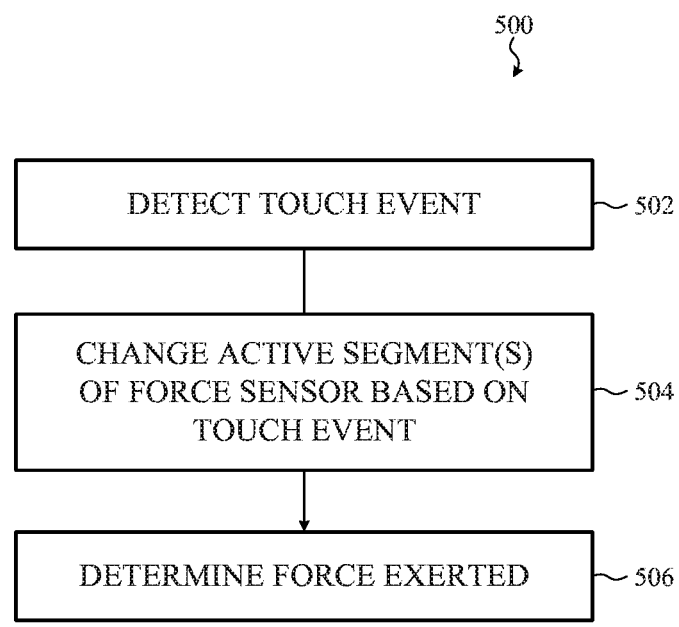
FIG. 5 is a simplified flow chart that illustrates example operations of a method of regulating power consumption of a segmented force-responsive sensor by modifying which segments of the force-responsive sensor are active based on a detected touch event.

FIG. 5 is a simplified flow chart that illustrates example operations of a method of regulating power consumption of a segmented force-responsive sensor by modifying which segments of the force-responsive sensor are active based on a detected touch event. As with other methods described herein, the method 500 can be performed by a processor within an electronic device, such as the electronic device 100 depicted in FIG. 1. More particularly, the method 500 can be performed by a power controller, such as the power controller 308 depicted in FIGS. 3A-3B.

The method 500 begins at operation 502 in which a touch event is detected. As with the method described above, a touch event may be a single-touch event or a multi-touch event. In many examples, the touch event is detected by a touch sensor, such as a capacitive touch sensor.

Next, at operation 504, an active segment or segments of the force sensor is changed based on the touch event detected in operation 402. For example, if the touch event is associated with a user touch adjacent to an edge of an input surface, segments of the force sensor proximate to that touch event can be activated whereas all other segments of the force sensor are deactivated.

Next, the method 500 can continue to operation 506 at which a force exerted may be determined from one or more outputs of the force sensor.

Figure 6:
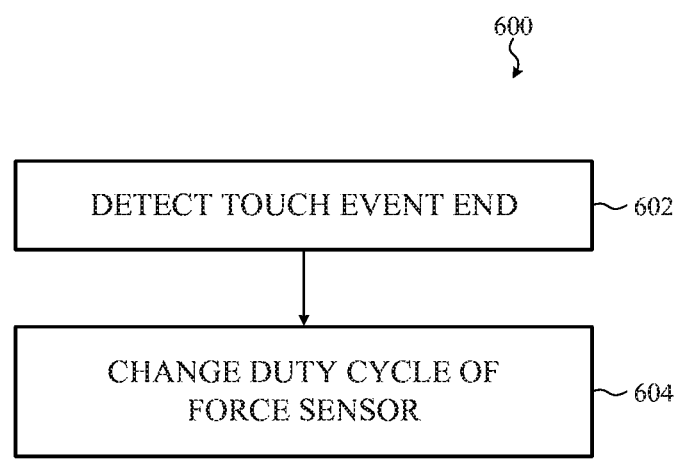
FIG. 6 is a simplified flow chart that illustrates example operations of a method of regulating power consumption of a force-responsive sensor by modifying a performance characteristic (e.g., duty cycle) of the force-responsive sensor after a touch event completes.

FIG. 6 is a simplified flow chart that illustrates example operations of a method of regulating power consumption of a force-responsive sensor by modifying a duty cycle of the force-responsive sensor after a touch event completes. As with other methods described herein, the method 600 can be performed by a processor within an electronic device, such as the electronic device 100 depicted in FIG. 1. More particularly, the method 600 can be performed by a power controller, such as the power controller 308 depicted in FIGS. 3A-3B.

The method 600 begins at operation 602 in which the end of a touch event is detected. In response, at operation 604, a duty cycle of the force sensor can be changed. As with other embodiments described herein, the duty cycle of the force sensor may be any duty cycle associated with the force sensor, or a component of the force sensor. Similarly, the duty cycle may be changed, based on the touch event, in any number of suitable ways.

Figure 7:
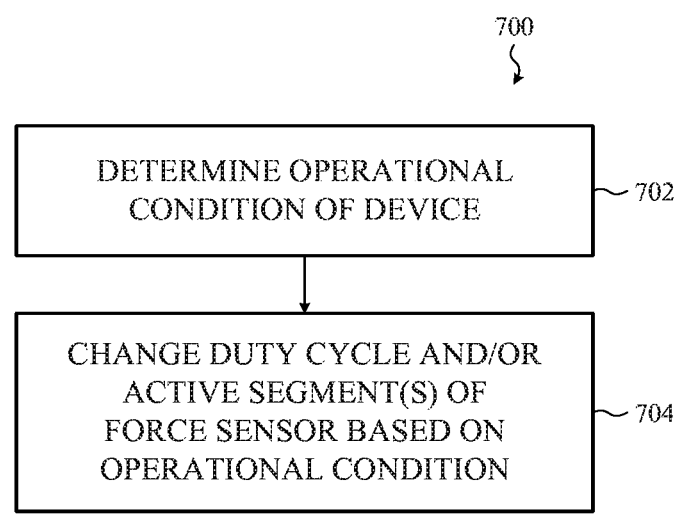
FIG. 7 is a simplified flow chart that illustrates example operations of a method of regulating power consumption of a segmented force-responsive sensor by modifying which segments of the force-responsive sensor are active based on an operational condition or setting of an electronic device incorporating the force-responsive sensor.

FIG. 7 is a simplified flow chart that illustrates example operations of a method of regulating power consumption of a segmented force-responsive sensor by modifying which segments of the force-responsive sensor are active based on an operational condition or setting of an electronic device incorporating the force-responsive sensor. As with other methods described herein, the method 700 can be performed by a processor within an electronic device, such as the electronic device 100 depicted in FIG. 1. More particularly, the method 700 can be performed by a power controller, such as the power controller 308 depicted in FIGS. 3A-3B.

The method 700 begins at operation 702 in which an operational condition of the electronic device is determined. The operational condition can be, but is not limited to, an application or program operating on the electronic device, a user setting, a system setting, and so on. Next, at operation 704, a duty cycle and/or an active segment of the force sensor can be changed based on the operational condition.

For example, embodiments described herein are not necessarily limited to measuring resistive sensors or strain sensors, and other sensors and other sensor types can be accurately measured using the systems and method described herein. Accordingly, it should be appreciated that the various embodiments described herein, as well as the functionality, operation, components, and capabilities thereof may be combined with other elements as necessary, and so any physical, functional, or operational discussion of an element or feature is not intended to be limited solely to that particular embodiment to the exclusion of others. In particular the power management techniques described herein may be equally applicable to other resistive sensors such as, but not limited to strain-based touch sensors, strain-based temperature sensors, resistive positional sensors, and so on.

Additionally, although many embodiments are described herein with respect to match-pairs of resistive structures, it may be understood that such a configuration may not be required for all embodiments or implementations. For example, as noted above, the matched properties of associated resistive structures may assist with noise reduction. However, in some embodiments, a desired degree of noise reduction may not require matching between resistive structures. In these embodiments, different resistive structures can be formed from different materials, may exhibit different resistances, and so on.

One may appreciate that although many embodiments are disclosed above, that the operations and steps presented with respect to methods and techniques described herein are meant as exemplary and accordingly are not exhaustive. One may further appreciate that alternate step order or, fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device comprising:
an input surface;
a force-responsive sensor coupled to the input surface and comprising an array of strain-sensitive elements, each associated with a different portion of the input surface;
a circuit coupled to each of the strain-sensitive elements; and
a power controller coupled to the circuit and configured to selectively enable a subset of the strain-sensitive elements in response to a touch event detected on the input surface, the subset of the strain-sensitive elements selected based on a location of the touch event; wherein the power controller is configured to change a duty cycle of the circuit to a first duty cycle if the location is near an edge of the input surface or to a second duty cycle if the location is near a center of the input surface.

2. The electronic device of claim 1, wherein the touch event is detected by a touch sensor positioned below the input surface.

3. The electronic device of claim 1, wherein the circuit is a readout circuit.

4. The electronic device of claim 1, wherein the power controller is further configured to change the duty cycle in response to the detected touch event.

5. The electronic device of claim 4, wherein:
the circuit comprises a drive circuit; and
the duty cycle is associated with an amplifier of the drive circuit.

6. The electronic device of claim 4, wherein the power controller is further configured to change the duty cycle based, at least in part, on the location.

7. The electronic device of claim 1, wherein the first duty cycle is greater than the second duty cycle.

8. A method of operating a force-responsive sensor comprising:
detecting a touch event on an input surface of an electronic device;
determining a subset of force-sensitive elements associated with a force-responsive sensor and proximate to the touch event;
activating each force-sensitive element of the subset of force-sensitive elements;
changing a performance characteristic of a drive circuit configured to apply a drive signal to each force-sensitive element of the subset of force-sensitive elements, the performance characteristic based on the proximity of the touch event to an edge of the input surface.

9. The method of claim 8, wherein the performance characteristic of the drive circuit is a duty cycle associated with an amplifier of the drive circuit.

10. The method of claim 8, wherein the operation of changing the performance characteristic of the drive circuit comprises increasing a duty cycle of the drive circuit.

11. The method of claim 8, wherein at least one force-sensitive element of the subset of force-sensitive elements is a strain-sensitive element.

12. The method of claim 8, wherein the performance characteristic is based, at least in part, on an operational setting of the electronic device.

13. An electronic device comprising:
an input surface;
a touch sensor positioned below the input surface;
a force-responsive sensor positioned below the input surface and comprising an array of strain-sensitive elements arranged in a pattern below the input surface; and
a power controller coupled to the force-responsive sensor and the touch sensor, the power controller configured to:
set a first performance characteristic of the force-responsive sensor in response to a touch detected at an edge of the input surface; and
set a second performance characteristic of the force-responsive sensor in response to a touch detected at a center of the input surface.

14. The electronic device of claim 13, further comprising an amplifier coupled to the force-responsive sensor and configured to amplify a sense signal output by the force-responsive sensor.

15. The electronic device of claim 13, wherein:
the power controller is configured to disable the force-responsive sensor in response to the touch sensor determining that a touch event has ended.

16. The electronic device of claim 13, further comprising:
a drive circuit comprising a signal source coupled to the force-responsive sensor.

17. The electronic device of claim 16, wherein:
the first performance characteristic is an amplifier duty cycle; and
the power controller is configured to change a signal source duty cycle of the signal source in response a touch detected at an edge of the input surface.

18. The electronic device of claim 13, wherein the first performance characteristic is an increased duty cycle.

19. The electronic device of claim 13, wherein at least one strain-sensitive element of the array of strain-sensitive elements is a resistive sensor.

* * * * *